May 10, 1955     C. J. CARR     2,708,144
CONNECTION FOR PUMP PISTONS
Filed Oct. 15, 1949
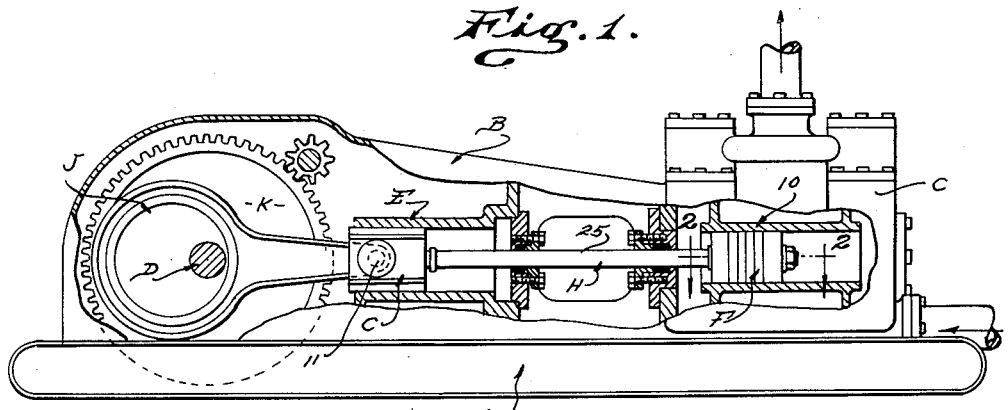
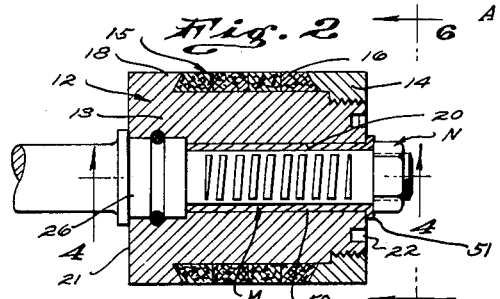
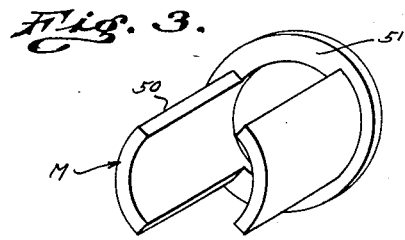
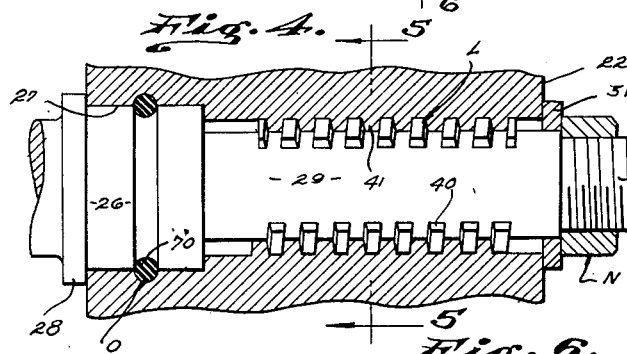
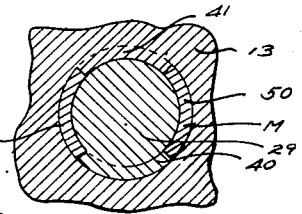
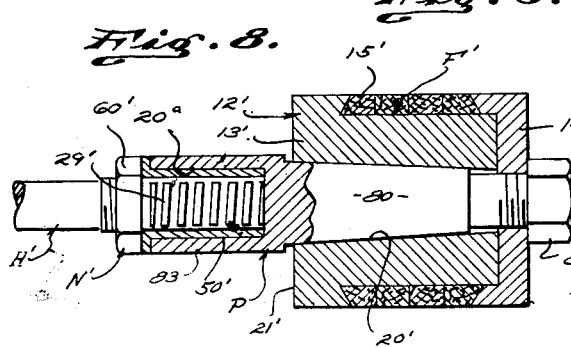
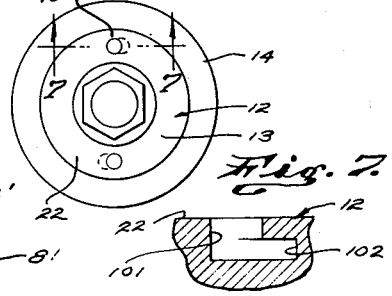
Inventor
Charles J. Carr
By
Attorney United States Patent Office 2,708,144
Patented May 10, 1955

2,708,144

CONNECTION FOR PUMP PISTONS

Charles J. Carr, Long Beach, Calif.

Application October 15, 1949, Serial No. 121,567

2 Claims. (Cl. 309—17)

This invention is concerned with a connection for pump pistons or the like and it is a general object of the invention to provide a simple secure dependable easily operated connection for joining a piston with a piston rod.

The present invention is primarily concerned with a connection for joining a piston with a piston rod and it is particularly useful for use in connection with the type of piston and rod construction that is employed in slush pumps or the like, and therefore I have illustrated a slush pump piston and have shown it in a typical slush pump and I will refer to the invention in this connection. It is to be understood, however, that the broader aspects of the invention are not to be limited by the specific reference herein made.

It is a general object of the present invention to provide a connection of the general character referred to which establishes a firm positive connection between the rod and piston and which is easily operated either to engage or disengage the rod and piston.

Another object of the invention is to provide a connection of the general character referred to which seats the piston on the rod with a wedge action so that no looseness occurs or develops between the elements as the structure operates.

A further object of the present invention is to provide a connection of the general character referred to which firmly and securely connects the rod and piston at the same time allowing the parts to be readily separated without the application of great force or pressure such as is usually required when a piston is wedged onto a tapered rod.

The various objects and features of my invention will be fully understood from the following detailed description of typical preferred forms and applications of my invention, throughout which description reference is made to the accompanying drawings, in which:

Fig. 1 is a side elevation of a typical slush pump showing certain parts thereof in section to illustrate a piston and a rod joined thereto. Fig. 2 is an enlarged view of the piston and rod taken as indicated by line 2—2 on Fig. 1. Fig. 3 is a perspective view of the lock device employed in the connection between the rod and piston. Fig. 4 is an enlarged detailed view taken as indicated by line 4—4 on Fig. 2, the piston being shown in section and the rod in elevation. Fig. 5 is a detailed transverse sectional view taken as indicated by line 5—5 on Fig. 4. Fig. 6 is a view taken as indicated by line 6—6 on Fig. 2. Fig. 7 is an enlarged detailed sectional view taken as indicated by line 7—7 on Fig. 6, and Fig. 8 is a view similar to Fig. 2 showing a modified form of construction.

Since the connection provided by the present invention is particularly useful and practical for connecting the rod and piston of slush pump, I have shown it in that connection and in the drawings I have illustrated a typical slush pump. The particular pump illustrated involves, generally, a bed or base A carrying a frame structure B which supports elements such as a cylinder block C, a shaft D, a cross head slide E, etc. The cylinder block C is shown as including a cylinder 10 in which a piston F operates, and a cross head G is carried in the slide E. A piston rod H connects the cross head G and the piston F. The cross head is operated from the shaft D by a cam J on the shaft which operates a crank arm K connected to the cross head by pivot pin 11.

The present invention is concerned primarily with the connection by which the piston F is joined to the rod H and the invention may be carried out so that the rod and piston are directly connected or coupled, as shown in Figs. 1 to 7, or it may be employed in a construction where a sub or piston extension is employed in connecting the rod and piston as shown in Fig. 8.

The piston F may, so far as the present invention is concerned, be varied widely in form and construction. In the drawings I have illustrated simple or conventional piston constructions, for instance, in Figs. 1 to 7, inclusive, the piston is shown as including a body 12 made up of sections 13 and 14 and packing means 15 carried by the body to have the desired sealing engagement in the cylinder 10. The particular piston illustrated has the body sections 13 and 14 threaded together so that they, in effect, form a solid rigid unit and the packing means 15 involves a plurality of packing rings 16 engaged around the periphery of the body section 13. The packing rings are confined between a flange portion 18 on body section 13 and the body section 14 which is threaded to the body section 13.

The body 12 of the piston F as above described is, in general, an elongate element round in cross sectional configuration and it has a central opening 20 extending through it from one end to the other receiving the rod H. In the particular case illustrated the inner and outer ends 21 and 22 of the body are flat and plain, as shown in the drawings.

The rod H is shown as a simple, straight, rod with a main portion 25 round in cross section. At the piston end of the rod it is provided with an enlargement or head 26 which enters a counterbore 27 provided in the end portion of the piston opening 20 from the inner end 21 of the piston. A flange 28 is provided on the rod where the main portion 25 joins the head 26 and when the piston is engaged on the rod the flange 28 is engaged by the inner end 21 of the piston. The rod has a projecting portion or extension 29 extending beyond the head 26 and through the opening 20 in the piston to a point beyond the outer end 22 of the piston.

As shown in Figs. 6 and 7 of the drawings, the outer end face 22 of the piston body section 13 is provided with openings 101 for a spanner wrench or the like. The openings are preferably arranged diametrically opposite each other and each is provided with a recess 102. In practice, the recesses may extend laterally in a common direction so that when a suitable spanner wrench with hooked jaws is applied, it may be turned to engage its jaws in the recesses so that the piston can be conveniently pulled from the cylinder 10.

The structure provided by the present invention involves, generally, means L releasably coupling the rod and piston, lock means M setting the means L against disengagement and a retainer N for the lock means. It is further preferred that the structure be provided with sealing means O between the rod and the body of the piston to prevent leakage between these parts.

The means L releasably coupling the piston and rod connects the projecting portion 21 of the rod with the body 12 of the piston and it is in the nature of an interrupted thread construction. As shown in the drawings the means L involves series of pitched thread-like projections 40 on the exterior of the rod portion 29 and extending longitudinally thereof and series of pitched thread-like projections 41 on the interior of the rod opening 20 and extending longitudinally thereof. The projections 40 and 41 are angularly disposed or helically pitched in the manner of screw threads and the series of projections on the rod portion 29 are circumferentially spaced leaving openings between the series through which the series of projections 41 on the piston body may pass or be engaged.

In the particular case illustrated there are two series of projections 41 on the rod portion 20 and they are located diametrically opposite each other and the projections of each series extend substantially 90° around the rod portion 29. There are two series of projections 41 on the inner wall of the rod opening 20 and they are located diametrically opposite each other and each extends substantially 90° around the wall of the opening. To engage the projections 40 and 41 the projections 41 on the piston body are passed between the series of projections 40 on the rod portion 29 until the piston body approaches the flange 28 whereupon the rod and piston are rotated relative to each other, causing the projections 40 and 41 to be engaged with consequent movement of the piston axially on the rod or toward the flange 28. The parts are arranged and proportioned so that when the projections 40 and 41 are fully engaged the end 21 of the piston body 12 seats against the flange 28 making the piston firm or tight on the rod.

The lock means M preferably includes one or more keys 50 engageable between the piston body and the rod portion 29 to occupy the space that occurs between the engaged series of projections 40 and 41 when the structure is set, as above described. In the particular case illustrated I employ two keys 50 arcuate in cross section to conform to the exterior of rod portion 29 and the interior of the piston opening 20 and the keys are of such length as to extend throughout the series of projections that are engaged in the manner above described. In the form of the invention illustrated the keys 50 are carried on or project from an annular member or collar 51 which seats against the outer end 22 of the piston body when the keys are in operating position, as shown in the drawings.

The retaining means N which acts to retain the keys in operating position is applied to the projecting end portion of the rod portion 29, that is, to the part of portion 29 which projects beyond the end 22 of the piston body 12. In the preferred form of the invention the means N involves a nut which is threadedly engaged on a suitable projecting end part 61 of rod portion 29. Thus located the nut is readily accessible from the outer end of the piston and in practice it is not subject to any severe pressure or strain, since it is relied upon primarily to hold the keys 50 against displacement, and under normal working conditions there is little or no tendency for the keys to move axially.

The sealing means O provided to act between the rod and piston body may be any suitable form of packing or sealing means that will prevent leakage between these parts. In the preferred form of the invention the means O is located at the head 26 and counterbore 27 and is in the nature of an O-ring 70 carried in registering grooves in the head 26 and counterbore 27, respectively.

It will be apparent that with the construction above described the piston can be easily and rapidly applied to the rod and by simple rotation between the rod and piston through about 90° the piston is made tight on the rod, ready to be locked by insertion of the keys 50. When the keys are in place they are easily made secure by the application of the nut 60 to the rod.

In the form of the invention shown in Fig. 8 the piston F' includes a body 12' made up of sections 13' and 14' and the body carries packing 15'. The piston further includes a sub or extension P which, for all intents and purposes, may be considered a rigid part or integral element of the piston body. In the particular case illustrated the sub is provided with a tapered shank 80 seated tightly in a tapered opening 20' in the body section 13'. An extension 81 of the shank 80 carries a clamp member or nut 82 that clamps the body section 14' to the body section 13' and clamps both of the body sections tightly on the sub. The sub P has an extension or projecting portion 83 that projects from the inner end 21' of the piston body and the extension 83 has an opening 20ᵃ receiving a portion 29' of the piston rod H'. In this form of the invention series of projections on the rod portion 29' and on the wall of the opening 20ᵃ correspond to the projections 40 and 41 above described. Lock means employed in this form of the invention include keys 50' that are inserted between the engaged projections in the manner hereinabove described. The retaining means N' in this form of the invention is a lock nut 60' threaded on the rod and serving to hold the keys engaged between the cooperating projections.

Having described only typical preferred forms and applications of my invention, I do not wish to be limited or restricted by the specific details herein set forth, but wish to reserve to myself any variations or modifications that may appear to those skilled in the art and fall within the scope of the following claims.

Having described my invention, I claim:

1. In combination, a piston rod with an end portion having a plurality of projections thereon, a piston with a portion having an opening central of the piston and extending longitudinally thereof, there being a plurality of projections on the wall of said opening engageable with the projections on the rod to connect the piston and rod against relative longitudinal movement, and an elongate lock key engageable with the said projections and holding the piston and rod against relative rotation with said projections engaged.

2. In combination, a piston having a body with a central longitudinal opening therein, a rod with a portion extending through the opening, means releasably coupling the piston and rod including cooperating parts fixed on and projecting from the exterior of the rod and inwardly from the wall of the opening, a key engageable with said projections locking the body and rod against relative rotation with said parts engaged, and a retainer on the rod normally holding the key in operating position.

References Cited in the file of this patent

UNITED STATES PATENTS

| Number | Name | Date |
|---|---|---|
| 1,368,167 | Laneville | Feb. 8, 1921 |
| 2,152,681 | Caminez | Apr. 4, 1939 |
| 2,158,591 | Ramsey | May 16, 1939 |
| 2,317,122 | Volpin | Apr. 20, 1943 |
| 2,321,160 | Schnitzer | June 8, 1943 |
| 2,361,095 | Harrah | Oct. 24, 1944 |
| 2,361,244 | Smith | Oct. 24, 1944 |
| 2,365,031 | Wickens | Dec. 12, 1944 |
| 2,409,852 | Harrah | Oct. 22, 1946 |
| 2,429,426 | Phillips | Oct. 21, 1947 |